United States Patent Office 2,885,278
Patented May 5, 1959

2,885,278
HERBICIDAL COMPOSITIONS CONTAINING ESTERS OF 1-ETHYNYLCYCLOHEXANOL

Karl Brack, Wilmington, Del., assignor to Hercules Powder Company, Wilmington, Del., a corporation of Delaware No Drawing. Application November 17, 1955
Serial No. 547,541

13 Claims. (Cl. 71—2.6)

This invention relates to herbicidal compositions of matter and more particularly to esters of 1-ethynylcyclohexanol.

In accordance with the present invention, it has been found that sulfites and carbonates of 1-ethynylcyclohexanol show strong growth inhibiting properties to vegetation when applied so as to come in contact with growing root tips of vegetation. Both the symmetrical and the unsymmetrical esters of this invention are effective herbicides, and the unsymmetrical esters which are effective include those in which the alcohol radical associated with the 1-ethynylcyclohexyl alcohol radical in the ester is alkyl, cycloalkyl or aryl and includes substituted alkyl and substituted aryl, and oxa-substituted alkyl and oxa-substituted cycloalkyl. The sulfites and carbonates of 1-ethynylcyclohexanol are generally applied to the medium in which the roots of vegetation normally grow as a dispersion on an inert solid carrier or in an aqueous emulsion of about 0.1% to 2% concentration as a carrier. In using the compositions of this invention, the herbicidal composition may be applied directly to the growth medium, such as soil in which vegetation normally will grow, prior to germination of the seeds of the vegetation or after the seeds have sprouted and formed roots.

The sulfites and carbonates of 1-ethynylcyclohexanol by acting through the growing roots rather than by absorption by the leafy portion of the vegetation may be applied to the upper layer of the soil in which leafy vegetation is already growing so as to kill or prevent the growth of vegetation whose roots lie mostly in the upper 1 to 1½ inches of soil. Thus the herbicide will act selectively if applied to soil supporting vegetation which is well established and which has deeply penetrating root systems growing among which are freshly sprouted seedlings whose root systems are quite close to the surface of the soil and will kill only the latter. The herbicide is also effective in killing all vegetation if applied so as to penetrate the growth medium to a depth sufficient to be adjacent the growing roots of all vegetation in the medium. However, when the emulsified compositions of this invention are added to soil by a sprinkling device, the active component is adsorbed by the upper layer of soil and is not washed in deeply by subsequent rains. If deeper menetration is desired so as to eradicate established plants, mechanical distribution of the toxicant to lower levels is used.

The compositions of this invention are particularly desirable herbicides since they have sufficient persistence to kill vegetation and yet they are not permanent and thus do not render the growth medium permanently toxic to vegetation. The gradual decrease in soil toxicity after destruction of undesirable vegetation is believed to be brought about by the action of soil organisms. The herbicidal material thus can be used to kill all plant life in the growth medium, and the growth medium, after a period of time, can then again be used for supporting desirable vegetation. While 1-ethynylcyclohexanol from which these esters are derived has herbicidal properties, its effectiveness in soil is low in comparison with the esters of this invention because of its lack of persistence in the soil to the degree required for practical herbicidal use.

The herbicidal compositions of this invention are prepared by the well known esterification reaction between 1-ethynylcyclohexanol and the acid chloride or acid ester chloride of sulfurous acid or of carbonic acid by well known methods.

The present invention is further illustrated but not limited by the following examples:

Preparation of sulfites 1-ethynylcyclohexyl 2-ethylhexyl sulfite was prepared by adding 34.4 parts 2-ethylhexyl chlorosulfinate dropwise to a mixture of 20 parts 1-ethynylcyclohexanol and 13.5 parts pyridine in 120 parts benzene at 40° C. After 2 hours stirring at 40° C. the mixture was cooled, poured into ice water, washed with water and dried over sodium sulfate. Removal of the benzene under reduced pressure left a residue of 1-ethynylcyclohexyl 2-ethylhexyl sulfite amounting to 46 parts which analyzed 10.5% sulfur.

Other sulfites prepared according to this procedure include: 1-ethynylcyclohexyl n-octyl sulfite, 1-ethynylcyclohexyl n-butoxyethyl sulfite, 1-ethynylcyclohexyl n-butyl sulfite, 1-ethynylcyclohexyl n-decyl sulfite, 1-ethynylcyclohexyl n-octadecyl sulfite, 1-ethynylcyclohexyl tetrahydrofurfuryl sulfite, 1-ethynylcyclohexyl nonyl sulfite, 1-ethynylcyclohexyl hydroabietyl sulfite, 1-ethynylcyclohexyl $\beta$-chloroethyl sulfite, 1-ethynylcyclohexyl n-dodecyl sulfite and bis(1-ethynylcyclohexyl) sulfite.

Preparation of carbonates 1-ethynylcyclohexyl n-hexyl carbonate was prepared by adding 27 parts n-hexyl chlorocarbonate dropwise to a mixture of 20 parts 1-ethynylcyclohexanol and 15 parts pyridine in 120 parts benzene at about 35° C. The product of the reaction was isolated by washing the reaction mixture with cold water, drying over sodium sulfate, and removing the solvent under reduced pressure to leave 23 parts 1-ethynylcyclohexyl n-hexyl carbonate as a residue of yellow liquid.

Other carbonates prepared according to this procedure include: 1-ethynylcyclohexyl n-hexyl carbonate, 1-ethynylcyclohexyl tetrahydrofurfuryl carbonate, 1-ethynylcyclohexyl phenyl carbonate, 1-ethynylcyclohexyl p-t-butylphenyl carbonate, 1-ethynylcyclohexyl 2-chloroethyl carbonate, 1-ethynylcyclohexyl ethyl carbonate, 1-ethynylcyclohexyl n-decyl carbonate, 1-ethynylcyclohexyl 2-ethylhexyl carbonate and bis(1-ethynylcyclohexyl) carbonate.

The compositions of this invention were made into emulsions for application to the soil by dissolving 3 grams of herbicidal ester in 40 ml. acetone and 2 ml. sorbitan monolaurate polyoxyethylene derivative (Tween 20) to form a concentrate. This concentrate was then diluted with water to form dispersions in water varying in concentration from 0.15 to 1.5%. These were used for sprinkling on trays of soil used for growth tests in amounts corresponding to 1 to 20 lb. per acre.

Plant injury tests were carried out in trays containing rich garden soil. For pre-emergence tests separate trays of soil, in which four different species of seeds of millet, corn, mustard and cotton were planted, were sprayed with aqueous emulsions of the various compositions in amounts corresponding to 2 and 20 lbs. per acre. Only seed of 90% germination or better was used, corrections being made for percent germination in blanks which were run simultaneously. Results of the pre-emergence tests are given as mean injury ratings on the four plant species in the tables set forth hereinafter. On individual species, the injury rating consists of an average value of percentage reduction in germination and survival, and reduction in growth of surviving plants. Post-emergence tests were made using the following five different species of plants: millet, corn, soybean, cotton and tomato. The plants were sprayed after they were established and true leaves were expanding using for the spray aqueous emulsions of the various compositions in amounts corresponding to 1 and 10 lbs. per acre. An injury rating was made 14 days after treatment consisting of percentage visible damage as indicated by leaf wilt and growth reduction caused by root injury. These results are tabulated hereinafter.

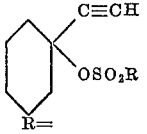

| Example | R= | Vegetation Injury Rating (Percent) | | | |
|---|---|---|---|---|---|
| | | Pre-emergence | | Post-emergence | |
| | | lb./acre=2 | lb./acre=20 | lb./acre=1 | lb./acre=10 |
| 1 | 2-Ethylhexyl | 27.5 | 70.0 | 0 | 30 |
| 2 | n-Octyl | 35.0 | 80.0 | 6 | 54 |
| 3 | n-Butoxyethyl | 27.5 | 72.5 | 6 | 76 |
| 4 | n-Butyl | 17.5 | 67.5 | 2 | 44 |
| 5 | n-Decyl | 12.5 | 42.5 | 0 | 8 |
| 6 | n-Octadecyl | 10.0 | 50.0 | 0 | 0 |
| 7 | Tetrahydrofurfuryl | 22.5 | 67.5 | 0 | 22 |
| 8 | Nonyl | 2.5 | 27.5 | 4 | 44 |
| 9 | Hydroabietyl | 5.0 | 27.5 | 0 | 0 |
| 10 | β-Chloroethyl | 12.5 | 47.5 | 0 | 24 |
| 11 | n-Dodecyl | 20.0 | 55.0 | 0 | 10 |
| 12 | Ethynylcyclohexyl | 27.5 | 85.0 | 6 | 28 |

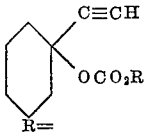

| Example | R= | Vegetation Injury Rating (Percent) | | | |
|---|---|---|---|---|---|
| | | Pre-emergence | | Post-emergence | |
| | | lb./acre=2 | lb./acre=20 | lb./acre=1 | lb./acre=10 |
| 13 | n-Hexyl | 42.5 | 75.0 | 0 | 16.0 |
| 14 | Tetrahydrofurfuryl | 37.5 | 85.0 | 4.0 | 40.0 |
| 15 | Phenyl | 37.5 | 87.5 | 0 | 20.0 |
| 16 | p-t-Butylphenyl | 30.0 | 77.5 | 4.0 | 22.0 |
| 17 | 2-Chloroethyl | 40.0 | 72.5 | 0 | 12.0 |
| 18 | Ethyl | 50.0 | 87.5 | 0 | 26.0 |
| 19 | n-Decyl | 27.5 | 77.5 | 0 | 18.0 |
| 20 | 2-Ethylhexyl | 30.0 | 80.0 | 0 | 12.0 |

The alcohol radical associated with the 1-ethynylcyclohexanol radical in the esters of this invention are alkyl radicals such as ethyl, hexyl, decyl, dodecyl, butyl, 2-ethylhexyl, hexadecyl, and isopropyl; cycloalkyl radicals such as cyclohexyl, methyl cyclohexyl, cyclopentyl, fenchyl, bornyl and isopropylcyclohexyl; oxaalkyl radicals such as ethoxyethyl, butoxyethyl, isopropoxyethyl and methoxyethyl; oxacycloalkyl radicals such as tetrahydrofurfuryl, and tetrahydropyranyl; aryl radicals such as phenyl, tolyl, naphthyl, p-t-butylphenyl, cyclohexylphenyl and octaphenyl; substituted aryl radicals such as benzyl; and oxa-substituted aryl radicals such as benzofuranyl, isobenzofuranyl, and 1,2-benzopyranyl.

The compounds of this invention are used as the sole toxic agent in herbicidal formulations or in admixture with other toxicants for modification of the properties of the individual toxicants. They may also be used in admixture with fertilizers.

The compounds of this invention are made into herbicidal compositions for use in controlling growth of vegetation by mixing with a surface active dispersing agent with or without added solvent to aid in dispersing in water as a carrier for application to the soil, or with a solid dispersing agent which may itself act as a carrier. Dispersions containing a surface active dispersing agent have the advantage of spreading the toxic substance more effectively over the soil area.

Aqueous dispersions are made up from the compounds of this invention, a surface active dispersing agent and water as the essential ingredients. The amount of the compounds of this invention in the aqueous dispersions when diluted for spraying of growth media will be in the range of 0.1% to about 10.0% of the aqueous dispersion. The aqueous dispersion will ordinarily be made up from a concentrate, and the concentrate will be dispersed in water to the proper concentration for application to the growth medium to be treated in the field. The concentrate is composed essentially of the compound of this invention and a surface active dispersing agent. The concentrate may also contain sufficient water soluble organic solvents to aid in effective dispersion. The amount of surface active dispersing agent used is usually at least 5% of the amount of toxic compound in the concentrate.

Suitable surface active dispersing agents for use in the compositions of this invention are the same as those disclosed in Chemistry of Insecticides, Fungicides, and Herbicides (Donald E. H. Frear, second edition (1948), pages 280–287) for use with insecticides and include neutral soaps of resin, alginic and fatty acids and alkali metals or alkyl amines or ammonia, saponins, gelatins, milk, soluble casein, flour or soluble proteins thereof, sulfite lye, lignin pitch, sulfite liquor, long-chain fatty alcohols having 12–18 carbon atoms and alkali metal salts of the sulfates thereof, salts of sulfated fatty acids, salts of sulfonic acids, esters of long-chain fatty acids and polyhydric alcohols in which alcohol groups are free, clays such as fuller's earth, China clay, kaolin, attapulgite, and bentonite and related hydrated aluminum silicates having the property of forming a colloidal gel. Among the other surface active dispersing agents which are useful in the compositions of this invention are the omega-substituted polyethylene glycols of relatively long-chain length, particularly those in which the omega substituent is aryl, alkyl, or acyl. Compositions of the toxic material and surface active dispersing agent will in some instances have more than one surface active dispersing agent for a particular type of utility. Thus, the toxic material may contain a clay as the sole adjuvant or clay and hydrocarbon, or clay and another surface active dispersing agent to augment the dispersing action of the clay. Likewise, the toxic material may have water admixed therewith along with the surface active dispersing agent, sufficient generally being used to form an emulsion. All of these compositions of toxic material and surface active dispersing agent may contain in addition synergists or fertilizers.

What I claim and desire to protect by Letters Patent is:

1. As a new composition of matter an ester of the group consisting of the symmetrical carbonate and sulfite of 1-ethynylcyclohexanol and the unsymmetrical carbonates and sulfites of 1-ethynylcyclohexanol and an alcohol in which the alcohol radical is selected from the group consisting of alkyl, cycloalkyl, aryl, oxa-substituted alkyl and oxa-substituted cycloalkyl.

2. As a new composition of matter an unsymmetrical carbonate of 1-ethylcyclohexanol and an alcohol in which the alcohol radical is selected from the group consisting of alkyl, cycloalkyl, aryl, oxa-substituted alkyl and oxa-substituted cycloalkyl.

3. As a new composition of matter an unsymmetrical sulfite of 1-ethynylcyclohexanol and an alcohol in which the alcohol radical is selected from the group consisting of alkyl, cycloalkyl, aryl, oxa-substituted alkyl and oxa-substituted cycloalkyl.

4. As a new composition of matter the symmetrical carbonate of 1-ethynylcyclohexanol.

5. As a new composition of matter the symmetrical sulfite of 1-ethynylcyclohexanol.

6. As a new composition of matter n-dodecyl 1-ethynylcyclohexyl sulfite.

7. As a new composition of matter phenyl 1-ethynylcyclohexyl carbonate.

8. 1-ethynyl-cyclohexyl ethyl carbonate.

9. A composition for application to growth media which normally support growing roots of vegetation for prevention of the growth thereof which comprises a compound of claim 1 and a dispersing agent therefor, the concentration of said compound in said composition being in the range of 0.1% to 2%.

10. A composition for application to growth media which normally support growing roots of vebetation for prevention of the growth thereof which comprises a compound of claim 2 and a dispersing agent therefor, the concentration of said compound in said composition being in the range of 0.1% to 2%.

11. A composition for application to growth media which normally support growth roots of vegetation for prevention of the growth thereof which comprises a compound of claim 3 and a dispersing agent therefor, the concentration of said compound in said composition being in the range of 0.1% to 2%.

12. A composition for application to growth media which normally support growing roots of vegetation for prevention of the growth thereof which comprises a compound of claim 6 and a dispersing agent therefor, the concentration of said compound in said composition being in the range of 0.1% to 2%.

13. A composition for application to growth media which normally support growing roots of vegetation for prevention of the growth thereof which comprises a compound of claim 7 and a dispersing agent therefor, the concentration of said compound in said composition being in the range of 0.1% to 2%.

References Cited in the file of this patent

UNITED STATES PATENTS

| | | |
|---|---|---|
| 2,567,987 | Baumgartner | Sept. 18, 1951 |

FOREIGN PATENTS

| | | |
|---|---|---|
| 505,421 | Belgium | Sept. 15, 1951 |
| 1,079,916 | France | May 26, 1954 |

OTHER REFERENCES

Pinkney et al. in "Journal American Chemical Society," vol. 58, pp. 972–74 (1936).

Bolling et al.: J. A. C. S., vol. 72, 5592–4 (1950).